US008280841B1

(12) United States Patent
Jung et al.

(10) Patent No.: US 8,280,841 B1
(45) Date of Patent: Oct. 2, 2012

(54) APPARATUS AND METHOD FOR STAGE JUDGMENT USING OF TECHNOLOGY LIFE CYCLE

(75) Inventors: Han Min Jung, Daejeon (KR); Won Kyung Sung, Daejeon (KR); Pyung Kim, Daejeon (KR); Mi Kyung Lee, Daejeon (KR); Seung Woo Lee, Daejeon (KR); Dong Min Seo, Daejeon (KR)

(73) Assignee: Korea Institute of Science & Technology Information, Daejeon (KR)

( * ) Notice: Subject to any disclaimer, the term of this patent is extended or adjusted under 35 U.S.C. 154(b) by 0 days.

(21) Appl. No.: 13/450,653

(22) Filed: Apr. 19, 2012

(30) Foreign Application Priority Data

Apr. 22, 2011 (KR) .................. 10-2011-0037801

(51) Int. Cl.
*G06F 7/00* (2006.01)
*G06F 17/00* (2006.01)
*G06F 17/30* (2006.01)

(52) U.S. Cl. .................. 707/602; 707/603; 707/740

(58) Field of Classification Search ................ None
See application file for complete search history.

(56) References Cited

U.S. PATENT DOCUMENTS 6,370,542 B1 * 4/2002 Kenyon ............... 707/603
7,698,303 B2 * 4/2010 Goodwin et al. ......... 707/603

FOREIGN PATENT DOCUMENTS

KR  10-2005-0096924 A  10/2005
KR  10-2009-0074688 A  7/2009

OTHER PUBLICATIONS

Kuusi et al., "Anticipating technological breakthroughs: Using bibliographic coupling to explore the nanotubes paradigm", vol. 70, No. 3, 2007, pp. 759-777, Springer-Verlag Berlin Hiedelberg.*
Tong et al., "Product lifecycle oriented digitization agile process preparation system", Computers in Industry vol. 59, Issues 2-3, Mar. 2008, pp. 145-153, Elsevier Science Ltd.*
Haupt et al., "Patent indicators for the technology life cycle development", Research Policy, vol. 36, Issue 3, Apr. 2007, pp. 387-398, Elsevier Science Ltd.*

* cited by examiner

*Primary Examiner* — Michael Hicks
(74) *Attorney, Agent, or Firm* — LRK Patent Law Firm (57) ABSTRACT

Stage determination apparatus including storage and processor includes: bibliographic database integrating heterogeneous resources; feature-set creation module calculating feature values of predefined features by searching the bibliographic database, and creating feature-set of each technology using the feature values, for technologies on technology lifecycle; answer-feature-set creation module calculating common feature value of feature sets of technologies belonging to the same stage in the technology lifecycle and creating answer-feature-set of each stage; stage determination module that, if technology is inputted, acquires feature values and creates feature-set for predefined features by searching the bibliographic database for the technology, compares corresponding feature value in the feature-set of the technology with feature value according to feature selection flow in previous decision tree according to the feature selection flow, and determines a stage having feature value finally selected according to the feature selection flow as a stage where the technology belongs to in the technology lifecycle.

18 Claims, 7 Drawing Sheets

APPARATUS AND METHOD FOR STAGE JUDGMENT USING OF TECHNOLOGY LIFE CYCLE

BACKGROUND OF THE INVENTION

1. Field of the Invention

The present invention relates to an apparatus and method for determining a stage using a technology lifecycle, and more specifically, to an apparatus and method for determining a stage using a technology lifecycle, in which a feature set is created for each technology positioned in the technology lifecycle, and a common feature value of feature sets of technologies belonging to the same stage in the technology lifecycle is calculated. If a specific technology is inputted, an answer feature set is created for each stage, and a feature set is created for the specific technology. Then, a stage where the specific technology belongs to in the technology lifecycle is determined by comparing the feature set of the specific technology with the answer feature set.

2. Background of the Related Art

The world is moving to a knowledge-based industrial society in which knowledge and information dominate competitiveness of a country, and particularly, competitiveness in science and technologies of a country is recognized as a foundation of competitiveness of the country.

Therefore, many countries in the world are trying to draw and select core technologies and research subjects in advance and concentrate on research and development of the technologies so as to survive future competitions.

In this reason, the countries find out promising research themes that will lead future science and technologies of the countries and provide a technology lifecycle thereof.

However, conventionally, if a specific technology does not exist in the technology lifecycle, it is difficult to figure out a stage where the specific technology belongs to in the technology lifecycle.

SUMMARY OF THE INVENTION

Accordingly, the present invention has been made in view of the above-mentioned problems occurring in the prior art, and it is an object of the present invention to provide an apparatus and method for determining a stage using a technology lifecycle, in which although a specific technology does not exist in the technology lifecycle, a stage where the specific technology lifecycle belongs to in the technology lifecycle can be determined using various kinds of bibliographic databases.

To accomplish the above object, according to an aspect of the present invention, there is provided an apparatus for determining a promising stage using a promising technology lifecycle, the apparatus including a storage and a processor and comprising: a bibliographic database for integrating heterogeneous resources; a feature set creation module for calculating feature values of predefined features by searching the bibliographic database, and creating a feature set of each promising technology using the calculated feature values, for promising technologies positioned on a promising technology lifecycle; an answer feature set creation module for calculating a common feature value of feature sets of promising technologies belonging to the same stage in the promising technology lifecycle and creating an answer feature set of each stage; a promising stage determination module for, if a specific technology is inputted, acquiring feature values and creating a feature set for predefined features by searching the bibliographic database for the specific technology, and determining a stage where the specific technology belongs to in the promising technology lifecycle by comparing the created feature set with the answer feature set.

The apparatus for determining a promising stage using a promising technology lifecycle may further include a visualization module for visualizing the promising technology lifecycle which shows a stage where the specific technology belongs to.

The bibliographic database integrates at least one of resources such as papers, patents, reports, academic data, newspapers, standards and numerical data.

The predefined feature includes at least one of the number of respective resources, ratios among the resources, the number of fields where a corresponding technology is found in each resource, the number of lower technology names, the number of researchers, an index of national competitiveness and growth potential, update records, records on final disposition, a period, a technical field classification table, the number of journals, the number of proceedings, a name of an author, a belonging organization, a name of a journal, an absolute growth rate of each resource, a relative growth rate of each resource, a growth rate with respect to the compound annual growth rate of each resource, a ratio of author to inventor among resources, an increase rate in the field of paper subjects, an increase rate of journals containing papers, authority of a journal containing a paper, growth potential of a country leading technology of each resource, a ratio of patent registration to patent application, and a patent family ratio.

The feature set creation module includes: a feature-related information acquisition unit for acquiring feature-related information for calculating feature values of features contained in a predefined feature set by searching the bibliographic database for the promising technologies; a feature value calculation unit for calculating a feature value of each promising feature by technology using the acquired feature-related information; and a feature set creation unit for creating a feature set containing the calculated feature values for each promising technology.

The answer feature set creation module obtains a common feature value for discriminating feature values of promising technologies belonging to the same stage in the promising technology lifecycle from feature values of the other stages and creates an answer feature set of each stage based on the common feature value.

The common feature value is at least one of an average, a range defined by minimum and maximum values, a standard deviation, and comparison between years.

The promising stage determination module includes: a feature-related information acquisition unit for acquiring feature-related information for calculating feature values of features contained in a predefined feature set by searching the bibliographic database, if the specific technology is inputted; a feature value calculation unit for calculating a feature value of each feature using the acquired feature-related information; a feature set creation unit for creating a feature set containing the calculated feature values for the specific technology; a feature set comparison unit for comparing the feature set of the specific technology with the answer feature set of each stage; and a stage determination unit for determining a stage of an answer feature set having a highest similarity as a stage where the specific technology belongs to in the promising technology lifecycle, as a result of comparison.

If there exists an absolute criterion, the feature set comparison unit compares a feature value corresponding to the absolute criterion among the feature set of the specific technology with a corresponding feature value of the answer feature set, and as a result of comparison, the stage determination unit determines a stage having a feature value of the highest similarity as a stage where the specific technology belongs to in the promising technology lifecycle.

The feature set comparison unit compares a corresponding feature value contained in the feature set of the specific technology with a feature value according to a feature selection flow set in a previously constructed decision tree according to the feature selection flow set in the decision tree, and the stage determination unit determines a stage having a feature value finally selected according to the feature selection flow of the decision tree as a stage where the specific technology belongs to in the promising technology lifecycle The feature value according to the feature selection flow set in the decision tree may be a feature value of the answer feature set.

To accomplish the above object, according to another aspect of the present invention, there is provided a computer-implemented method of determining a promising stage using a promising technology lifecycle, the method including the steps of: (a) creating a feature set for each promising technology positioned on the promising technology lifecycle; (b) calculating a common feature value of feature sets of promising technologies belonging to the same stage in the promising technology lifecycle and creating an answer feature set of each stage; (c) if a specific technology is inputted, creating a feature set for the specific technology and determining a stage where the specific technology belongs to in the promising technology lifecycle by comparing the feature set of the specific technology with the answer feature set.

The computer-implemented method of determining a promising stage using a promising technology lifecycle may further include the step of: visualizing the promising technology lifecycle which shows the stage where the specific technology belongs to.

Step (a) includes the steps of: acquiring feature-related information for calculating feature values of features contained in a predefined feature set by searching the bibliographic database for the promising technologies; calculating a feature value of each feature by promising technology using the acquired feature-related information; and creating a feature set containing the calculated feature values for each promising technology.

Step (b) obtains a common feature value for discriminating feature values of promising technologies belonging to the same stage in the promising technology lifecycle from feature values of the other stages and creates an answer feature set of each stage based on the common feature value.

The common feature value is at least one of an average, a range defined by minimum and maximum values, a standard deviation, and comparison between years.

Step (c) includes the steps of: acquiring feature-related information for calculating feature values of features contained in a predefined feature set by searching the bibliographic database, if the specific technology is inputted; calculating a feature value of each feature using the acquired feature-related information; creating a feature set containing the calculated feature values for the specific technology; comparing the feature set of the specific technology with the answer feature set of each stage; and determining a stage of an answer feature set having a highest similarity as a stage where the specific technology belongs to in the promising technology lifecycle, as a result of comparison.

Step (c) includes the steps of: if the specific technology is inputted, acquiring feature-related information for calculating feature values of features contained in a predefined feature set by searching the bibliographic database; calculating a feature value of each feature using the acquired feature-related information; and creating a feature set containing the calculated feature values for the specific technology; and if there exists an absolute criterion, comparing a feature value corresponding to the absolute criterion among the feature set of the specific technology with a corresponding feature value of the answer feature set; and as a result of comparison, determining a stage having a feature value of the highest similarity as a stage where the specific technology belongs to in the promising technology lifecycle.

Step (c) includes the steps of: if the specific technology is inputted, acquiring feature-related information for calculating feature values of features contained in a predefined feature set by searching the bibliographic database; calculating a feature value of each feature using the acquired feature-related information; creating a feature set containing the calculated feature values for the specific technology; comparing a corresponding feature value contained in the feature set of the specific technology with a feature value according to a feature selection flow set in a previously constructed decision tree according to the feature selection flow set in the decision tree; and determining a stage having a feature value finally selected according to the feature selection flow of the decision tree as a stage where the specific technology belongs to in the promising technology lifecycle.

The feature value according to the feature selection flow set in the decision tree may be a feature value of the answer feature set.

As described above, according to the present invention, although a specific technology does not exist in a technology lifecycle, a stage where the specific technology lifecycle belongs to in a technology lifecycle can be determined using various kinds of bibliographic databases.

DESCRIPTION OF SYMBOLS

100: Stage determination apparatus
110: Bibliographic database

120: Interface module
130: Feature set creation module
132, 152: Feature-related information acquisition unit
134, 154: Feature value calculation unit
136, 156: Feature set creation unit
140: Answer feature set creation module
150: Stage determination module
158: Feature set comparison unit
160: Stage determination unit
170: Visualization module

DETAILED DESCRIPTION OF THE PREFERRED EMBODIMENT

Details of the objects, technical configurations, and operational effects of the present invention described above will be further clearly understood hereinafter according to the detailed descriptions with reference to the drawings accompanied in the specification of the present invention.

Figure 1:
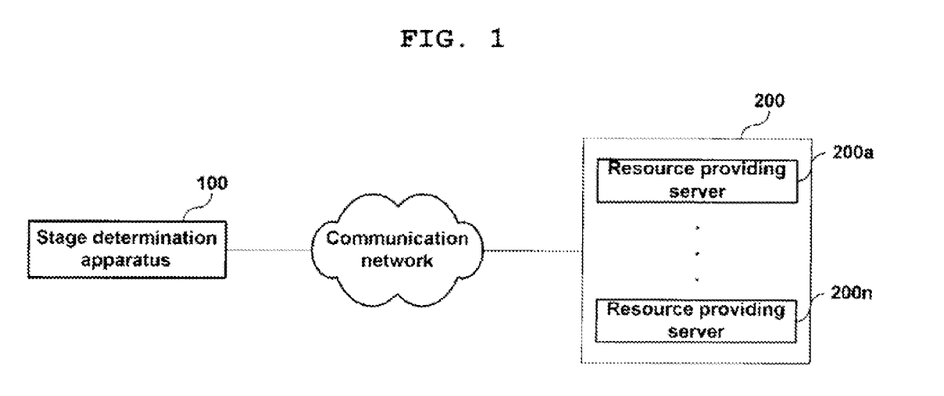
FIG. 1 is a view showing a system for determining a stage of a technology using a technology lifecycle according to the present invention.

FIG. 1 is a view showing a system for determining a stage of a technology using a technology lifecycle according to the present invention.

Referring to FIG. 1, the system for determining a stage of a technology using a technology lifecycle includes a stage determination apparatus 100 for collecting and integrating resources from a plurality of resource providing servers 200a, 200b, ..., 200n (hereinafter, referred to as 200) and determining a stage where a specific technology belongs to using the integrated resources.

The resource providing server 200 is a server which provides papers, patents, reports, academic data, newspapers, standards and the like.

The stage determination apparatus 100 creates a feature set for each technology positioned on a technology lifecycle and an answer feature set of each stage.

In addition, if a specific technology is inputted, the stage determination apparatus 100 creates a feature set for the specific technology and determines a stage where the specific technology belongs to in the technology lifecycle by comparing the created feature set with the answer feature set.

The stage determination apparatus 100 operating as described above will be described with reference to FIG. 2.

Figure 2:
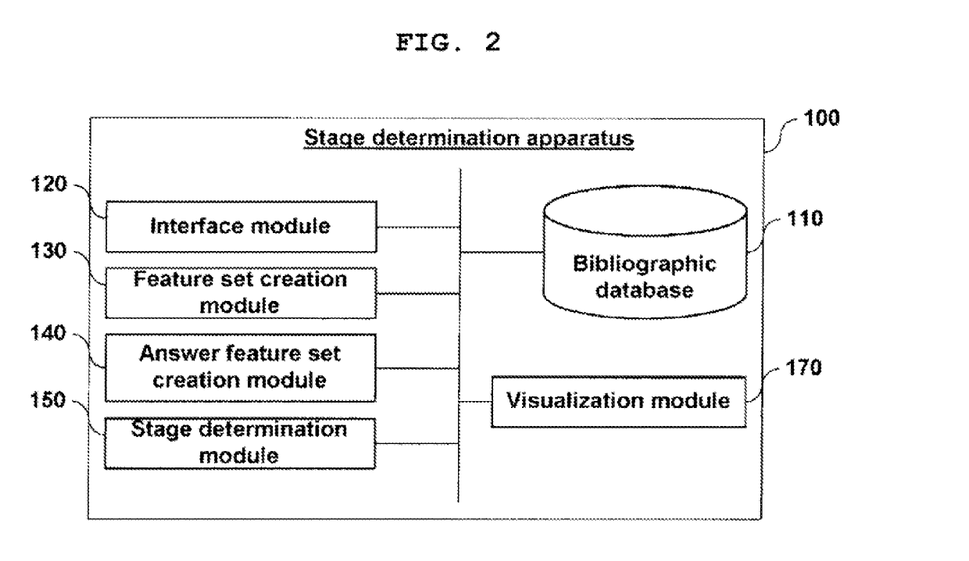
FIG. 2 is a block diagram schematically showing the configuration of a stage determination apparatus according to the present invention.
Figure 3:
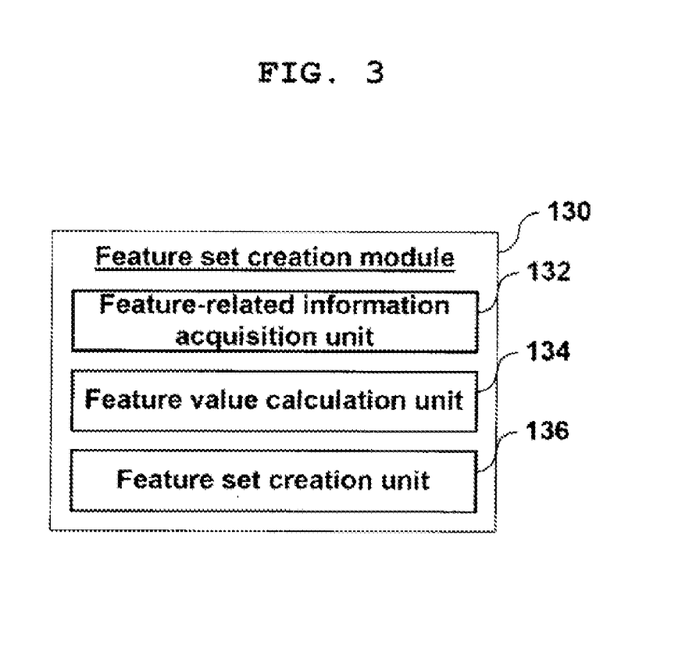
FIG. 3 is a block diagram specifically showing the configuration of a feature set creation module of FIG. 2.
Figure 4:
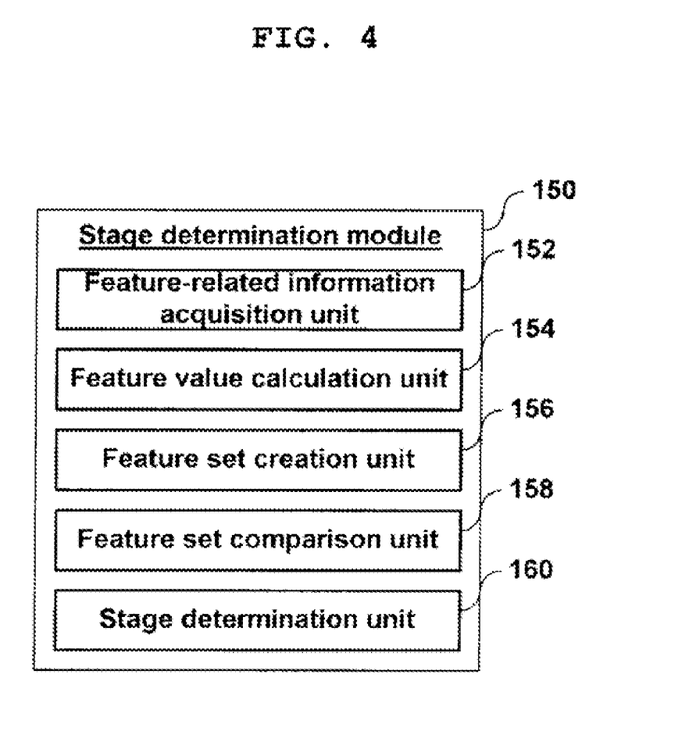
FIG. 4 is a block diagram specifically showing the configuration of a stage determination module of FIG. 2.

FIG. 2 is a block diagram schematically showing the configuration of a stage determination apparatus according to the present invention, FIG. 3 is a block diagram specifically showing the configuration of a feature set creation module of FIG. 2, and FIG. 4 is a block diagram specifically showing the configuration of a stage determination module of FIG. 2.

Referring to FIG. 2, the stage determination apparatus 100 includes a bibliographic database 110, an interface module 120, a feature set creation module 130, an answer feature set creation module 140, a stage determination module 150, and a visualization module 170.

The bibliographic database 110 integrates at least one of resources such as papers, patents, reports, academic data, newspapers, and standards.

The interface module 120 performs interfaces with a user and receives a specific technology from the user. For example, the interface module 120 is an interface module or a key input unit connected to a user terminal, through a communication network.

The feature set creation module 130 obtains feature values of predefined features by searching the bibliographic database 110 for technologies positioned on the technology lifecycle and creates a feature set for each technology using the calculated feature values.

The technology lifecycle may be a graph where stages of various technologies are displayed.

Referring to FIG. 3 for the feature set creation module 130, the feature set creation module 130 includes a feature-related information acquisition unit 132, a feature value calculation unit 134 and a feature set creation unit 136.

The feature-related information acquisition unit 132 acquires feature-related information for calculating feature values of features contained in a predefined feature set by searching the bibliographic database 110 for the technologies. Here, the features contained in the feature set are previously defined as the number of papers, the number of patents, a grade of a country, ratios among resources, the number of fields where a corresponding technology is found in each resource, the number of lower technology names, the number of researchers, a technical field classification table, the number of journals, the number of proceedings, a name of an author, a name of a journal, an absolute growth rate of papers or patents for each resource, a growth rate with respect to the compound annual growth rate of each resource, a ratio of author to inventor among resources, an increase rate in the field of paper subjects, an increase rate of journals containing papers, a ratio of patent registration to patent application and the like.

The feature-related information is base information for obtaining the features described above, such as papers, patents and the like related to a corresponding technology.

The feature value calculation unit 134 obtains a feature value of each feature by the technology using the acquired feature-related information.

For example, if the feature-related information is papers and patents, the feature value calculation unit obtains feature values of the number of papers, the number of patents, a grade of a country, a ratio of papers to patents, the number of fields where a corresponding technology is found in the paper, the number of lower technology names, the number of researchers and the like, using the acquired papers and patents.

The feature set creation unit 136 creates a feature set containing the calculated feature values for each technology. That is, the feature set creation unit 136 creates a feature set shown in Table 1 by the technology.

TABLE 1

| ID | Descriptions | Value | Unit |
|----|--------------|-------|------|
| 1 | Ratio of papers to patents | 130 | % |
| 2 | The number of papers | 17 | piece |
| 3 | The number of fields where a corresponding technology is found in a paper | 4 | piece |
| 4 | The number of lower technology names | 8 | piece |
| 5 | ... | | |

Referring to Table 1, the feature set contains features and feature values corresponding to the features, and the feature values are expressed in a unit such as %, the number of pieces, the number of cases or the like.

The features contained in the feature set are predefined elements.

The answer feature set creation module 140 obtains a common feature value of feature sets of technologies belonging to the same stage in the technology lifecycle and creates an answer feature set of each stage.

That is, the answer feature set creation module 140 obtains common feature values for discriminating feature values of the technologies belonging to the same stage in the technology lifecycle from feature values of the other stages, and creates an answer feature set of each stage based on the common feature values.

Here, the common feature value is an average, a range defined by minimum and maximum values, a standard deviation, comparison between years or the like. Here, the comparison between years comparing feature values between the years of reference year-1 (B), reference year-2 (C) and reference year-3 (D), in which the current year is determined as a reference year (A). That is, the comparison between years may have a syntax of comparing feature values between the years, such as A>B, B>A, or B>C.

The answer feature set created by the answer feature set creation module 140 is as shown in Table 2.

TABLE 2

| 'Technology Trigger' stage | | | | |
|---|---|---|---|---|
| ID | Descriptions | Value | Unit | Weighting factor |
| 1 | Ratio of papers to patents | 100~300 | % | 0.2 |
| 2 | The number of papers | 1~5 | piece | 0.3 |
| 3 | The number of fields where a corresponding technology is found in a paper | 1~2 | piece | 0.15 |
| 4 | The number of lower technology names | Less than five | piece | 0.1 |
| 5 | ... | | | |

Table 2 shows an answer feature set corresponding to the "Technology Trigger" stage in the technology lifecycle.

A common feature value, a unit of the feature value and a weighting factor are set in the answer feature set. The weighting factor is used to obtain a similarity, which is an index for determining a stage where a feature set of a specific technology belongs to.

In some of the technologies, feature values of a specific stage may be overlapped with feature values of the other stages. Therefore, the answer feature set creation module 140 obtains common feature values for discriminating feature values of each stage and creates an answer feature set of each stage, in a method of excluding such cases as collisions occur among the stages by removing feature values overlapped among different stages and removing extreme feature values in each stage.

If a specific technology is inputted through the interface module 120, the stage determination module 150 acquires feature values and creates a feature set for predefined features by searching the bibliographic database 110 for the specific technology, and determines a stage where the specific technology belongs to in the technology lifecycle by comparing the created feature set with the answer feature set.

Referring to FIG. 4 for the stage determination module 150, the stage determination module 150 includes a feature-related information acquisition unit 152, a feature value calculation unit 154, a feature set creation unit 156, a feature set comparison unit 158 and a stage determination unit 160.

If a specific technology is inputted, the feature-related information acquisition unit 152 acquires feature-related information for calculating feature values of features contained in a predefined feature set by searching the bibliographic database 110.

The feature value calculation unit 154 obtains a feature value for each feature using the acquired feature-related information.

The feature set creation unit 156 creates a feature set of the specific technology containing the feature values calculated by the feature value calculation unit 154.

The feature set comparison unit 158 compares the feature set of the specific technology with the answer feature set of each stage. At this point, the feature set comparison unit 158 obtains a similarity to the answer feature set of each stage by applying a weighting factor to each feature value contained in the feature set of the specific technology.

In addition, if there exists an absolute criterion, the feature set comparison unit 158 compares a feature value corresponding to the absolute criterion among the feature set of the specific technology with a corresponding feature value of the answer feature set. Here, the absolute criterion may be a criterion randomly selected from the feature set.

Figure 9:
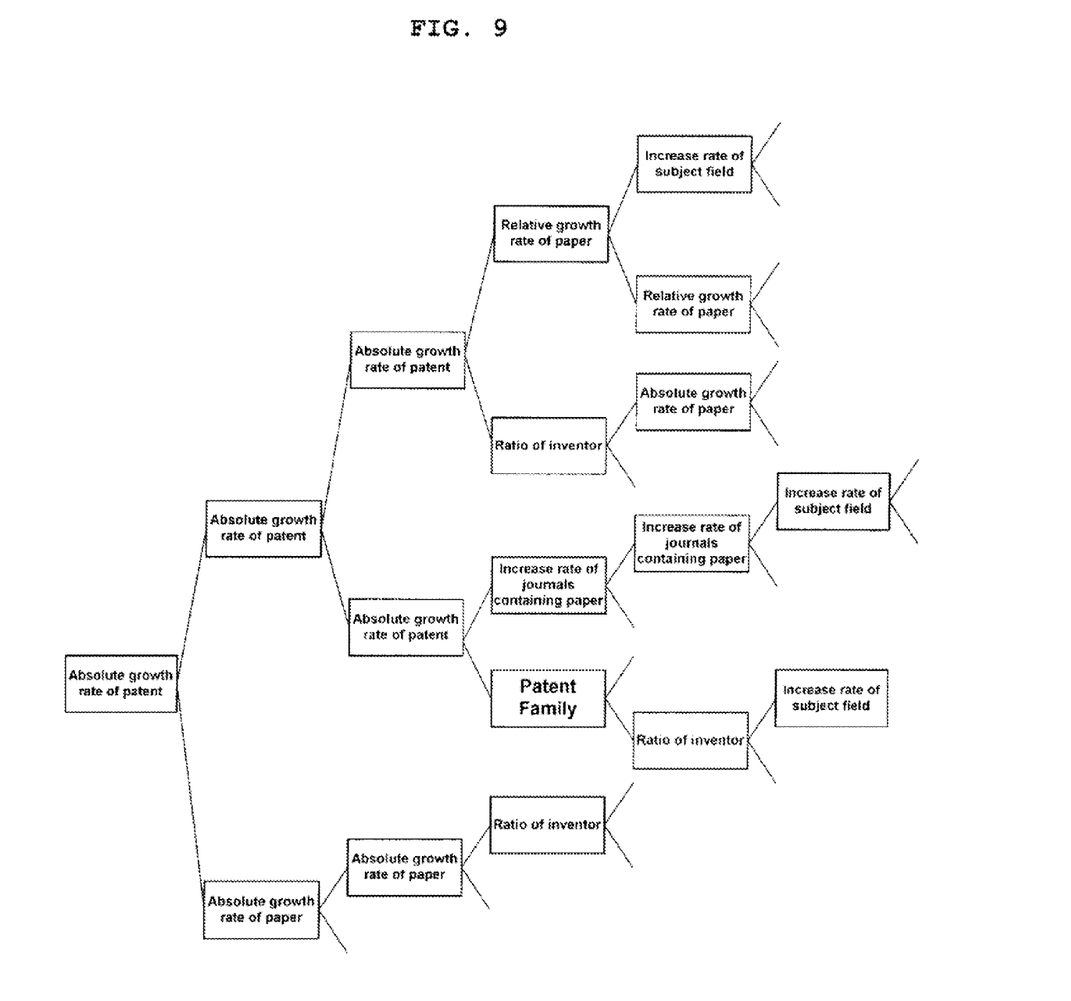
FIG. 9 is a view showing an example of a decision tree according to the present invention.

In addition, according to a feature selection flow set in a previously constructed decision tree, the feature set comparison unit 158 may compare a corresponding feature value contained in the feature set of the specific technology with a feature value according to the feature selection flow set in the decision tree. The decision tree may be formed as shown in FIG. 9. That is, the feature value according to the feature selection flow set in the decision tree is a feature value of the answer feature set.

Constitutional components of the decision tree are configured using features, and the form and method of the decision tree correspond to those of a general decision tree, and thus detailed descriptions thereof will be omitted.

As a result of comparison of the feature set comparison unit 158, the stage determination unit 160 determines a stage of an answer feature set having a common feature value closest to a feature value of the specific technology feature set among the common feature values of the answer feature set of each stage as a stage where the specific technology belongs to in the technology lifecycle.

For example, if the feature set of the specific technology is closest to the third stage of the answer feature set as a result of comparison between the feature set of the specific technology and the answer feature set, the stage determination unit 160 determines that the specific technology belongs to the third stage in the technology lifecycle.

In addition, the stage determination unit 160 may determine a stage having a feature value finally selected according to the feature selection flow of the decision tree as a stage where the specific technology belongs to in the technology lifecycle.

The visualization module 170 visualizes the technology lifecycle which shows the stage where the specific technology belongs to. That is, the visualization module 170 expresses the specific technology on the technology lifecycle and outputs the technology lifecycle.

Figure 5:
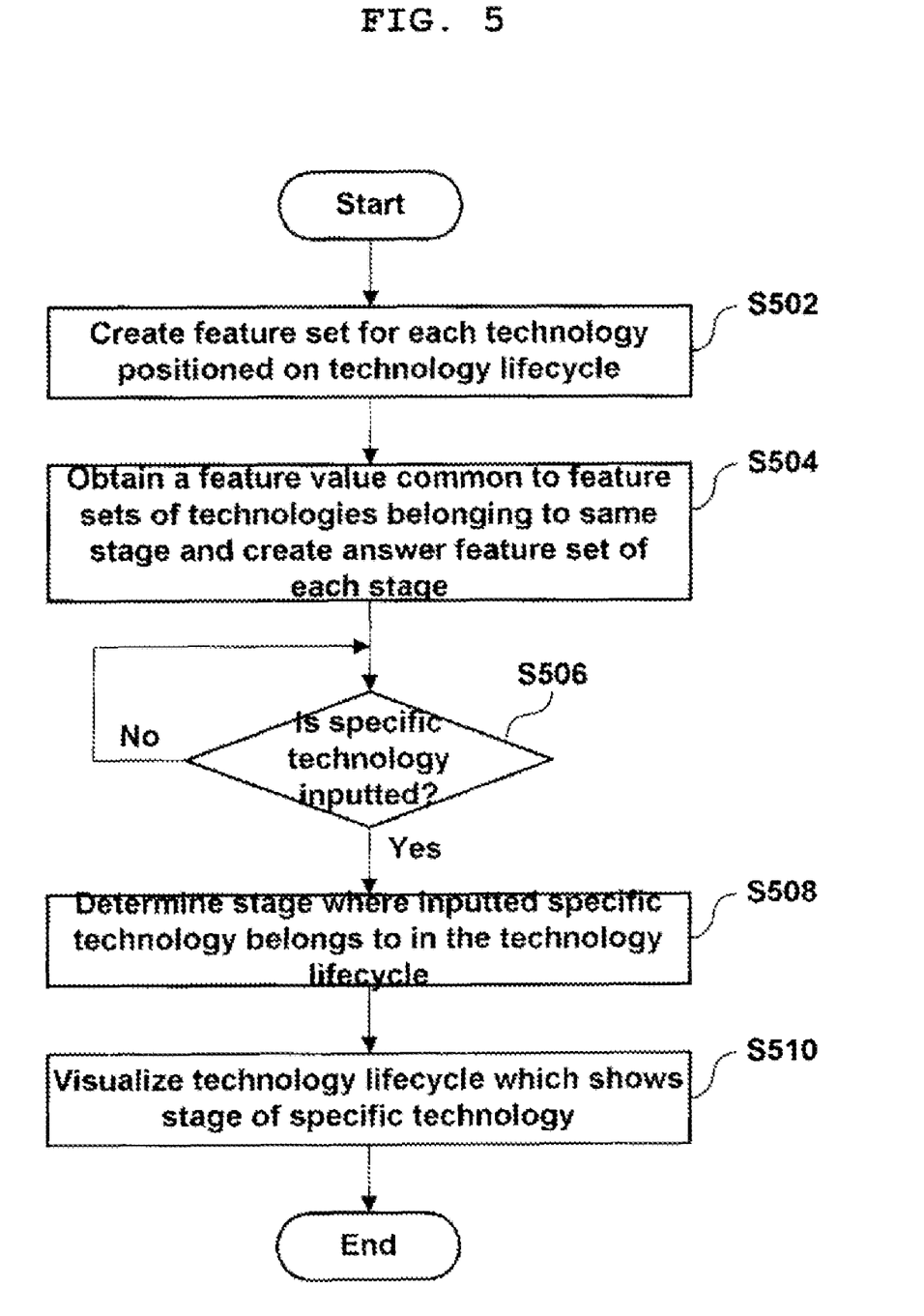
FIG. 5 is a flowchart illustrating a computer-implemented method of determining a stage of a technology using a technology lifecycle by a stage determination apparatus according to the present invention.

FIG. 5 is a flowchart illustrating a computer-implemented method of determining a stage of a technology using a technology lifecycle by a stage determination apparatus according to the present invention.

Referring to FIG. 5, the stage determination apparatus creates a feature set for each technology positioned on a technology lifecycle S502.

A technique of the stage determination apparatus for creating a feature set for each technology will be described in detail with reference to FIG. 6.

After performing step S502, the stage determination apparatus obtains a common feature value of feature sets of technologies belonging to the same stage in the technology lifecycle and creates an answer feature set of each stage S504. That is, the stage determination apparatus obtains common feature values for discriminating feature values of the technologies belonging to the same stage in the technology lifecycle from feature values of the other stages, and creates an answer feature set of each stage based on the common feature values.

If a specific technology is inputted S506 after performing step S504, the stage determination apparatus determines a stage where the specific technology belongs to in the technology lifecycle S508. A computer-implemented method of determining a stage where the specific technology belongs to in the technology lifecycle will be described in detail with reference to FIG. 7.

After performing step S508, the stage determination apparatus visualizes the technology lifecycle which shows the stage where the specific technology belongs to S510.

Figure 8:
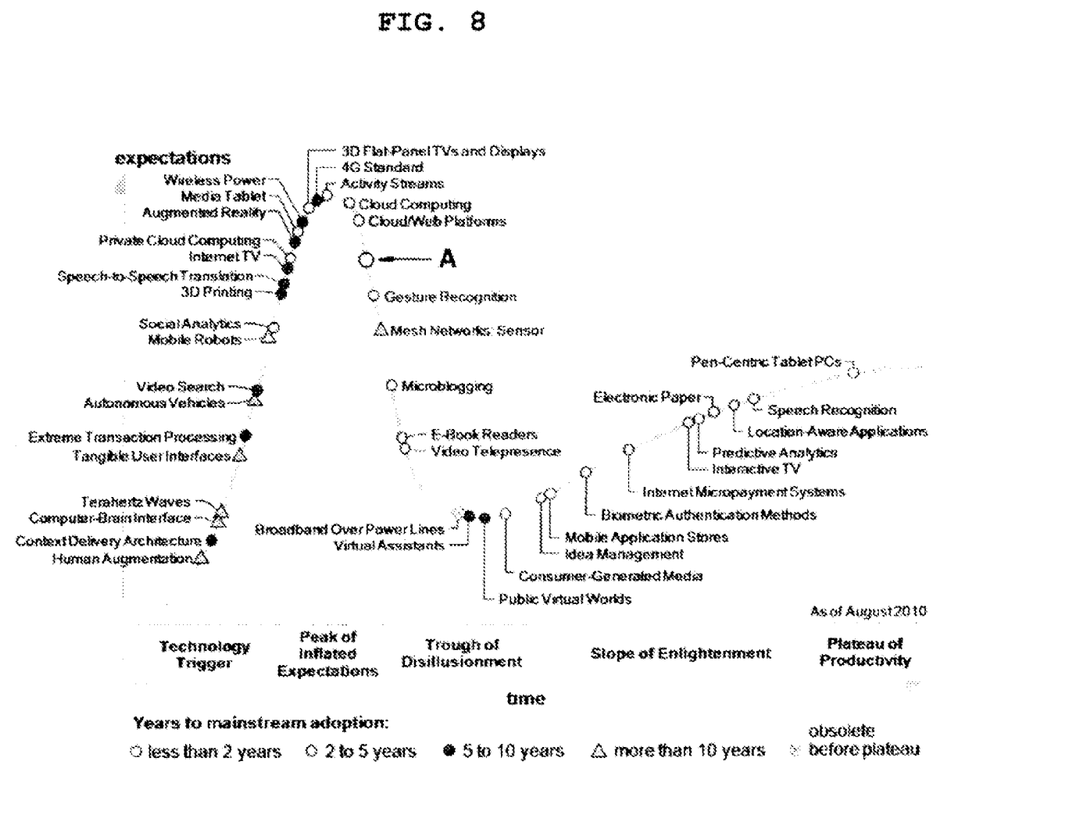
FIG. 8 is a view showing an example of a technology lifecycle which shows stages of a specific technology according to the present invention.

That is, the stage determination apparatus displays the technology lifecycle which shows the stage where the specific technology belongs to as shown in FIG. 8.

Referring to FIG. 8, the specific technology, as well as the other technologies, is displayed in each of the predefined stages of the technology lifecycle which shows the stage where the specific technology belongs to.

That is, the technology lifecycle described above includes five stages in total, such as a Technology Trigger stage, a Peak of Inflated Expectations stage, a Trough of Disillusionment stage, a Slope of Enlightenment stage, and a Plateau of Productivity stage.

Each stage shows technologies belonging to the stage, as well as the specific technology. For example, technologies of Biometric Authentication Methods, Internet Micropayment System, Interactive TV, Predictive Analytic, Electronic Paper, Location Aware Application, and Speech Recognition are shown in the Slope of Enlightenment stage, and specific technology 'A' is shown in the Peak of Inflated Expectations stage.

The user may easily confirm a stage where the specific technology inputted by the user belongs to using the visualized technology lifecycle.

Here, although the stages of the technology lifecycle are expressed as five stages in total, such as the Technology Trigger stage, the Peak of Inflated Expectations stage, the Trough of Disillusionment stage, the Slope of Enlightenment stage and the Plateau of Productivity stage, the stages of the technology lifecycle can be set or modified in a different form such as a first stage, a second stage, a third stage and the like.

Figure 6:
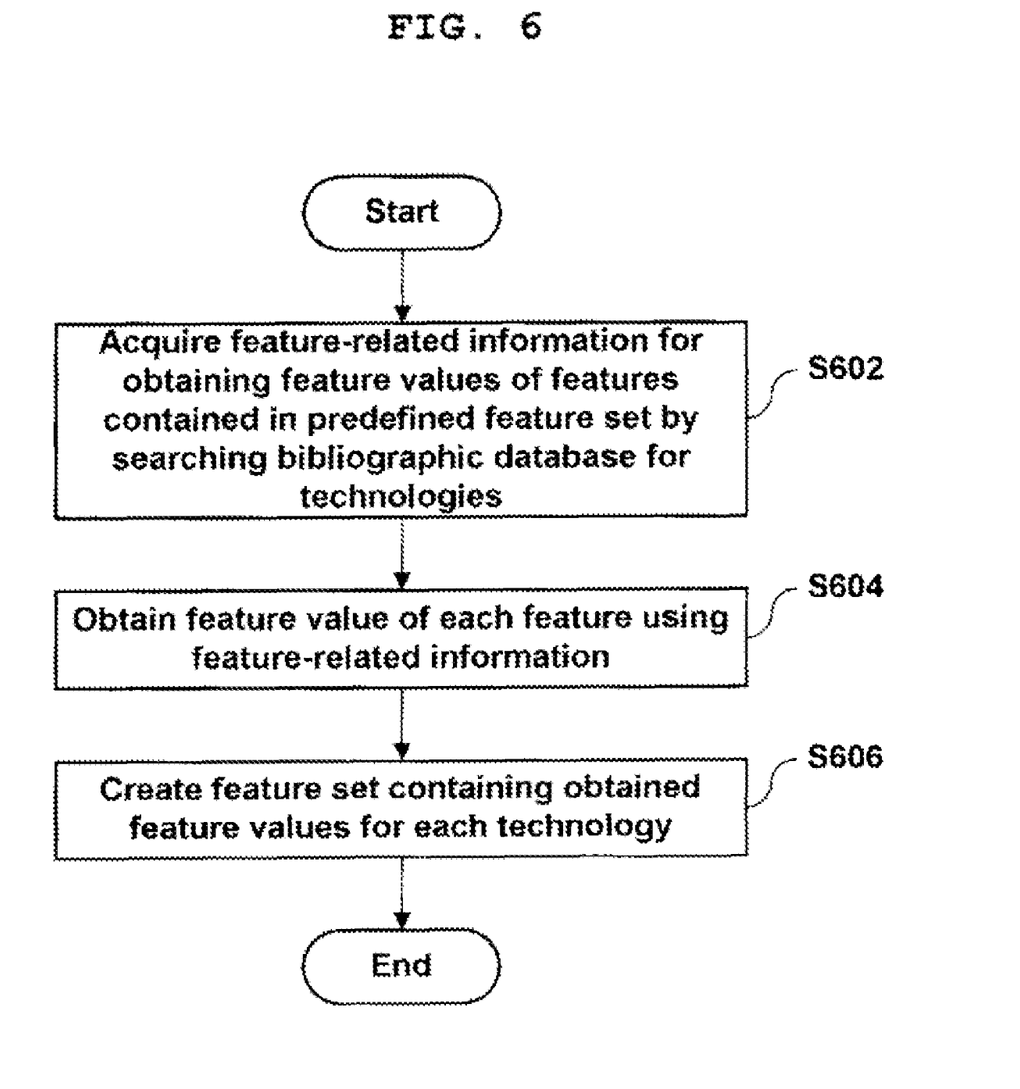
FIG. 6 is a flowchart illustrating a method of creating a feature set for each technology by a stage determination apparatus according to the present invention.

FIG. 6 is a flowchart illustrating a method of creating a feature set for each technology by a stage determination apparatus according to the present invention.

Referring to FIG. 6, the stage determination apparatus acquires feature-related information for calculating feature values of features contained in a predefined feature set by searching the bibliographic database for the technologies S602.

Then, the stage determination apparatus obtains a feature value of each feature by the technology using the acquired feature-related information S604 and creates a feature set containing the calculated feature values for each technology S606.

Figure 7:
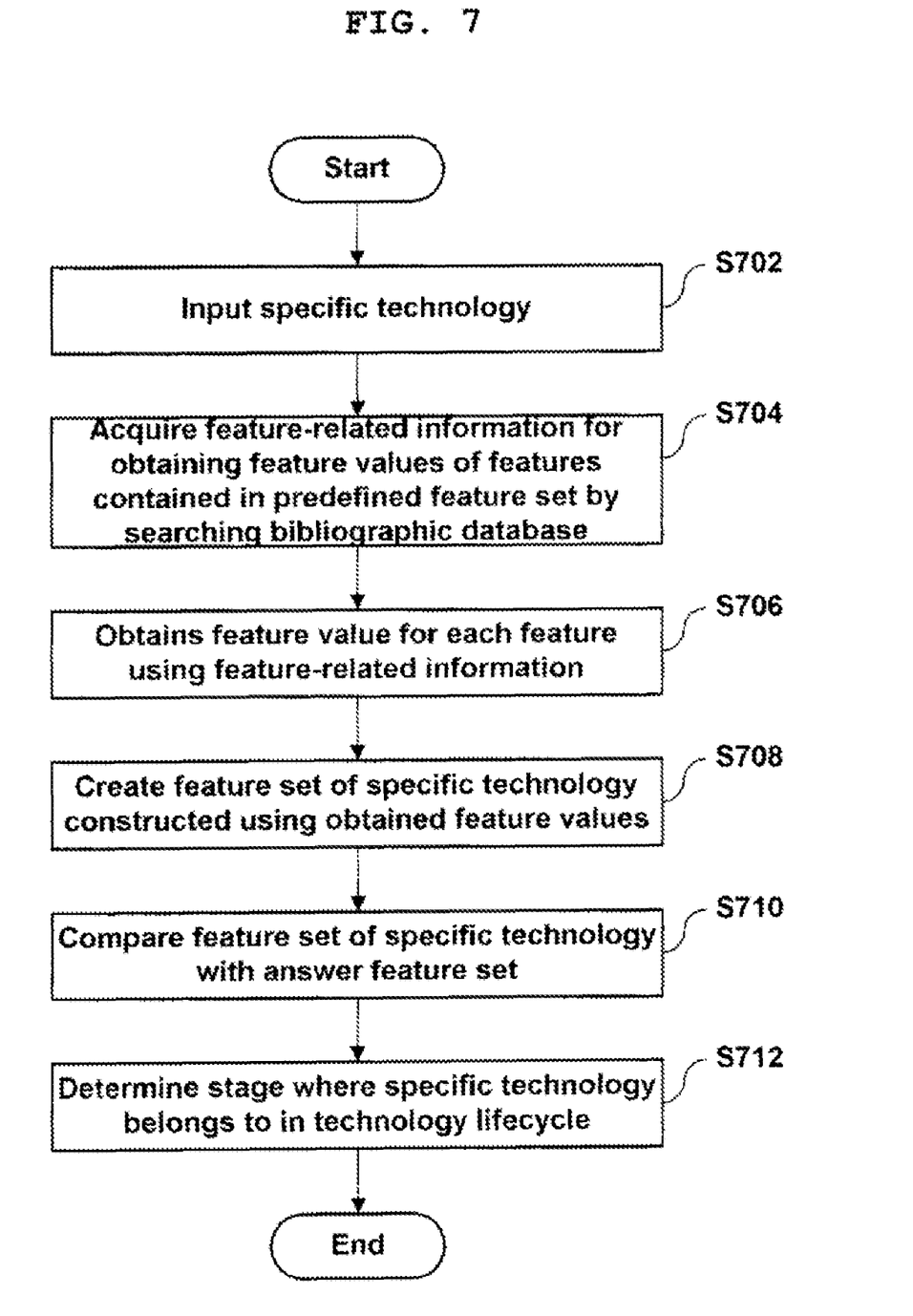
FIG. 7 is a flowchart illustrating a computer-implemented method of determining a stage of a specific technology by a stage determination apparatus according to the present invention.

FIG. 7 is a flowchart illustrating a computer-implemented method of determining a stage of a specific technology by a stage determination apparatus according to the present invention.

Referring to FIG. 7, if a specific technology is inputted S702, the stage determination apparatus acquires feature-related information for calculating feature values of features contained in a predefined feature set by searching the bibliographic database S704.

After performing step S704, the stage determination apparatus obtains a feature value for each feature using the acquired feature-related information S706 and creates a feature set of the specific technology constructed using the calculated feature values S708.

After performing step S708, the stage determination apparatus compares the feature set of the specific technology with the answer feature set of each stage S710 and determines a stage of an answer feature set having the highest similarity as a result of comparison as a stage where the specific technology belongs to in the technology lifecycle S712.

Although it is described above that a similarity is calculated by comparing the feature set of the specific technology with the answer feature set of each stage and a stage is determined using the calculated similarity, the stage determination apparatus may determine a stage of the specific technology using an absolute criterion or a decision tree.

That is, if there exists an absolute criterion, the stage determination apparatus may compare a feature value according to the absolute criterion among the feature set of the specific technology with a corresponding feature value of the answer feature set, and determine a stage having a feature value of the highest similarity as a result of comparison as a stage where the specific technology belongs to in the technology lifecycle.

In addition, according to a feature selection flow set in a previously constructed decision tree, the stage determination apparatus may compare a corresponding feature value contained in the feature set of the specific technology with a feature value according to the feature selection flow set in the decision tree, and determine a stage having a feature value finally selected according to the feature selection flow of the decision tree as a stage where the specific technology belongs to in the technology lifecycle.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A stage determination apparatus including a storage and a processor and comprising:
 a bibliographic database configured to integrate heterogeneous resources;
 a feature set creation module configured to calculate feature values of predefined features by searching the bibliographic database, and to create a feature set of each technology using the calculated feature values, for technologies positioned on a technology lifecycle;
 an answer feature set creation module configured to calculate a common feature value of feature sets of technologies belonging to the same stage in the technology lifecycle and to create an answer feature set of each stage;
 a stage determination module configured to, if a specific technology is inputted, acquire feature values and create a feature set for predefined features by searching the bibliographic database for the specific technology, to compare a corresponding feature value contained in the feature set of the specific technology with a feature value according to a feature selection flow set in a previously constructed decision tree according to the feature selection flow set in the decision tree, and to determine a stage having a feature value finally selected according to the feature selection flow of the decision tree as a stage where the specific technology belongs to in the technology lifecycle.

2. The apparatus according to claim 1, further comprising:
a visualization module configured to visualize the technology lifecycle which shows a stage where the specific technology belongs to.

3. The apparatus according to claim 1, wherein the bibliographic database integrates at least one of resources such as papers, patents, reports, academic data, newspapers, and standards.

4. The apparatus according to claim 1, wherein the predefined feature includes at least one of the number of respective resources, ratios among the resources, the number of fields where a corresponding technology is found in each resource, the number of lower technology names, the number of researchers, a technical field classification table, the number of journals, the number of proceedings, a name of an author, a name of a journal, an absolute growth rate of papers or patents for each resource, a growth rate with respect to the compound annual growth rate of each resource, a ratio of author to inventor among resources, an increase rate in the field of paper subjects, an increase rate of journals containing papers, and a ratio of patent registration to patent application.

5. The apparatus according to claim 1, wherein the feature set creation module includes:
a feature-related information acquisition unit configured to acquire feature-related information for calculating feature values of features contained in a predefined feature set by searching the bibliographic database for the technologies;
a feature value calculation unit configured to calculate a feature value of each feature by technology using the acquired feature-related information; and
a feature set creation unit configured to create a feature set containing the calculated feature values for each technology.

6. The apparatus according to claim 1, wherein the answer feature set creation module calculates a common feature value for discriminating feature values of technologies belonging to the same stage in the technology lifecycle from feature values of the other stages and creates an answer feature set of each stage based on the common feature value.

7. The apparatus according to claim 6, wherein the common feature value is at least one of an average, a range defined by minimum and maximum values, a standard deviation, and comparison between years.

8. The apparatus according to claim 1, wherein the year-specific stage determination module includes:
a feature-related information acquisition unit configured to acquire feature-related information for calculating feature values of features contained in a predefined feature set by searching the bibliographic database, if the specific technology is inputted;
a feature value calculation unit configured to calculate a feature value of each feature using the acquired feature-related information;
a feature set creation unit configured to create a feature set containing the calculated feature values for the specific technology;
a feature set comparison unit configured to compare feature values of the feature set of the specific technology with common feature values of the answer feature set of each stage; and
a stage determination unit configured to determine a stage of an answer feature set having a common feature value closest to a feature value of the specific technology feature set among common feature values of the answer feature set of each stage as a stage where the specific technology belongs to in the technology lifecycle, as a result of comparison.

9. The apparatus according to claim 8, if there exists an absolute criterion, the feature set comparison unit compares a feature value corresponding to the absolute criterion among the feature set of the specific technology with corresponding common feature values of the answer feature set of each stage, and
as a result of comparison, the stage determination unit determines a stage of an answer feature set having a common feature value closest to a feature value corresponding to the absolute criterion as a stage where the specific technology belongs to in the technology lifecycle.

10. The apparatus according to claim 1, wherein the feature value according to the feature selection flow set in the decision tree is a feature value of the answer feature set.

11. A computer-implemented method of determining a stage using a technology lifecycle by a stage determination apparatus, the method comprising the steps of:
(a) creating a feature set for each technology positioned on the technology lifecycle;
(b) calculating a common feature value of feature sets of technologies belonging to the same stage in the technology lifecycle and creating an answer feature set of each stage;
(c) if a specific technology is inputted, creating a feature set for the specific technology and determining a stage where the specific technology belongs to in the technology lifecycle by comparing the feature set of the specific technology with the answer feature set, wherein
step (c) include the steps of:
if a specific technology is inputted, acquiring feature-related information for calculating feature values of features contained in a predefined feature set by searching a bibliographic database;
calculating a feature value for each feature using the acquired feature-related information;
creating a feature set containing the calculated feature values for the specific technology;
comparing a corresponding feature value contained in the feature set of the specific technology with a feature value according to a feature selection flow set in a previously constructed decision tree according to the feature selection flow set in the decision tree; and
determining a stage having a feature value finally selected according to the feature selection flow of the decision tree as a stage where the specific technology belongs to in the technology lifecycle.

12. The method according to claim 11, further comprising the step of:
visualizing the technology lifecycle which shows the stage where the specific technology belongs to.

13. The method according to claim 11, wherein step (a) includes the steps of:
acquiring feature-related information for calculating feature values of features contained in a predefined feature set by searching the bibliographic database for the technologies;
calculating a feature value of each feature by technology using the acquired feature-related information; and
creating a feature set containing the calculated feature values for each technology.

14. The method according to claim 11, wherein step (b) calculates a common feature value for discriminating feature values of technologies belonging to the same stage in the technology lifecycle from feature values of the other stages and creates an answer feature set of each stage based on the common feature value.

15. The method according to claim 14, wherein the common feature value is at least one of an average, a range defined by minimum and maximum values, a standard deviation, and comparison between years.

16. The method according to claim 11, wherein step (c) includes the steps of:
- if the specific technology is inputted, acquiring feature-related information for calculating feature values of features contained in a predefined feature set by searching the bibliographic database;
- calculating a feature value of each feature using the acquired feature-related information;
- creating a feature set containing the calculated feature values for the specific technology;
- comparing feature values of the feature set of the specific technology with common feature values of the answer feature set of each stage; and
- as a result of comparison, determining a stage of an answer feature set having a common feature value closest to a feature value of the specific technology feature set among common feature values of the answer feature set of each stage as a stage where the specific technology belongs to in the technology lifecycle.

17. The method according to claim 11, wherein step (c) includes the steps of:
- if the specific technology is inputted, acquiring feature-related information for calculating feature values of features contained in a predefined feature set by searching the bibliographic database;
- calculating a feature value of each feature using the acquired feature-related information;
- creating a feature set containing the calculated feature values for the specific technology;
- if there exists an absolute criterion, comparing a feature value corresponding to the absolute criterion among the feature set of the specific technology with a corresponding common feature value of the answer feature set of each stage; and
- as a result of comparison, determining a stage of an answer feature set having a common feature value closest to a feature value corresponding to the absolute criterion as a stage where the specific technology belongs to in the technology lifecycle.

18. The method according to claim 11, wherein the feature value according to the feature selection flow set in the decision tree is a feature value of the answer feature set.

\* \* \* \* \*